Figure 1:
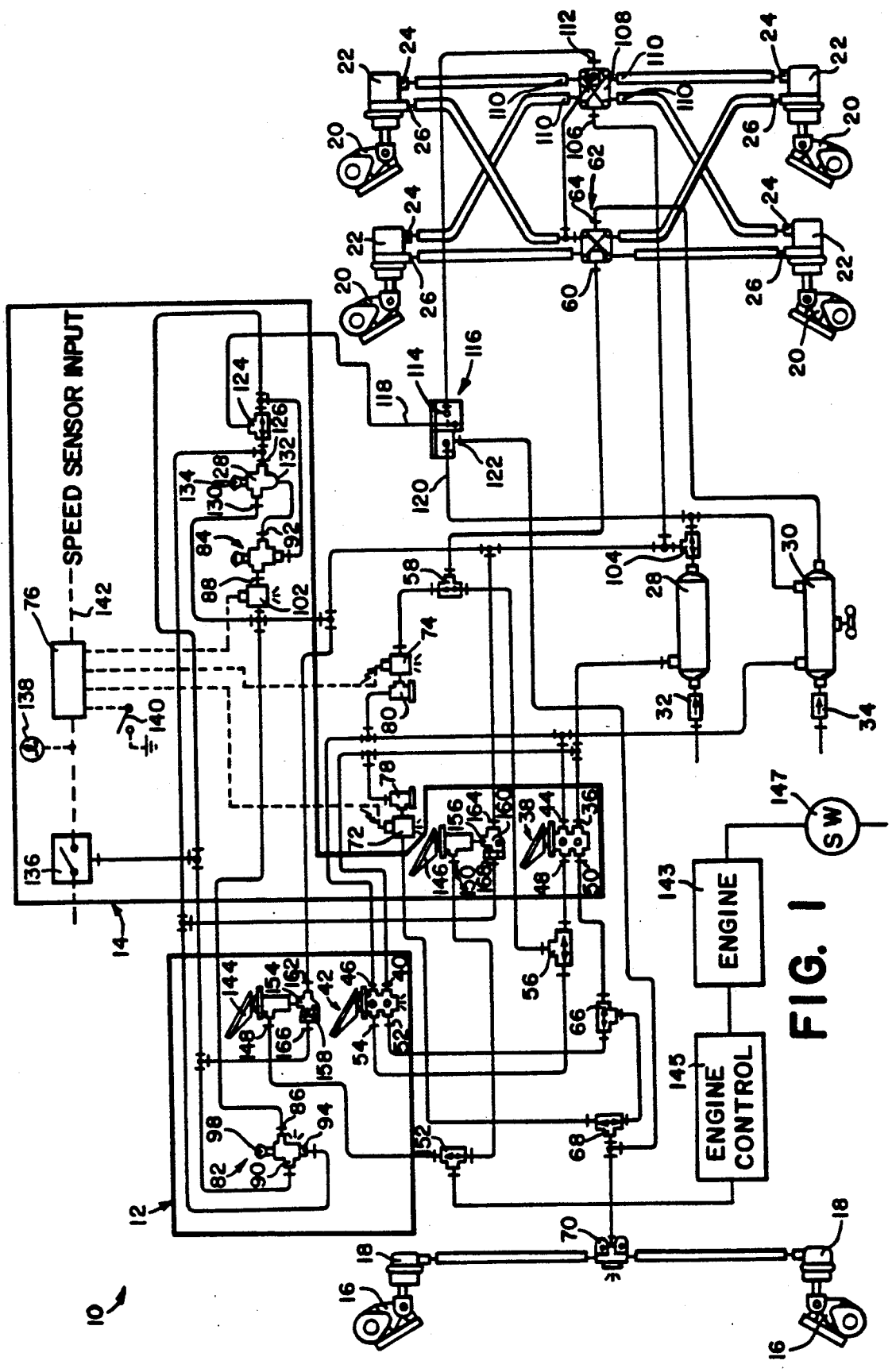

United States Patent [19]

Eberling et al.

[11] Patent Number: 5,036,961
[45] Date of Patent: Aug. 6, 1991

[54] AUXILIARY PARKING BRAKE SYSTEM

[75] Inventors: Charles E. Eberling, Wellington; Kenneth L. Cramer, Avon Lake, both of Ohio

[73] Assignee: Allied-Signal Inc., Morristown, N.J.

[21] Appl. No.: 495,818

[22] Filed: Mar. 16, 1990

[51] Int. Cl.⁵ .................. B60K 41/20; B60T 13/00; B60T 15/16

[52] U.S. Cl. ................ 192/1.23; 192/1.33; 192/1.41; 303/2; 303/13; 188/166 F

[58] Field of Search ............... 192/1.23, 1.31, 1.32, 192/1.33, 1.4, 1.41, 1.51; 303/2, 13; 188/106 P, 106 F

[56] References Cited

U.S. PATENT DOCUMENTS

| | | | |
|---|---|---|---|
| 2,292,105 | 8/1942 | Davis | 303/13 |
| 3,572,847 | 3/1971 | Luft | 303/13 |
| 3,582,150 | 6/1971 | Williams et al. | 303/2 X |
| 3,842,950 | 10/1974 | Fontaine | 192/1.32 X |
| 4,673,222 | 6/1987 | Knight | 303/13 X |

Primary Examiner—Richard Lorence
Attorney, Agent, or Firm—Ken C. Decker; William N. Antonis

[57] ABSTRACT

A fluid pressure braking system for a vehicle having service brakes and spring activated parking brakes includes electropneumatic activators for effecting and holding a limited service brake application while the driver leaves the vehicle to make a route pick-up. Accordingly, the spring brakes are not used during route pick-ups, thereby increasing the life of the spring actuator since it is not repeatedly cycled. An electropneumatic interlock automatically effects a parking brake application if the vehicle ignition is switched off while an electropneumatic service actuation is effected.

16 Claims, 2 Drawing Sheets

AUXILIARY PARKING BRAKE SYSTEM

This invention relates to a braking system for vehicles equipped with air brakes that make repeated stops.

Heavy vehicles equipped with air brakes, such as refuse trucks, must make repeated brief stops. In prior art vehicles, the vehicle operator was forced to set the parking brakes at each stop, thereby continually cycling the spring brakes. Repeated application and release of spring brakes can cause premature failure of the spring brakes due to fatigue of the spring, and also requires large quantities of air, so that the air dryer never regenerates. However, it is necessary that, when the vehicle is stopped temporarily, to effect a brake application to hold the vehicle in place while the driver leaves the cab. The present invention effects and holds a limited service brake application during such stops. The system disclosed in the present application also prevents "false parking" by assuring that the spring applied parking brakes are actuated in the event that the ignition switch of the vehicle is turned to the "off" position while the service brakes are applied. The system disclosed herein also provides a speed interlock to prevent misuse of the service brake hold feature at speeds above a predetermined maximum speed.

It has also been proposed that refuse trucks be provided with a dual set of controls. A set of normal cab controls is provided for operating the vehicle at highway speeds when the vehicle is traveling long distances, and remote cab drive controls are provided in a position which facilitates driver entry and exit from the vehicle during route pickups. A system pursuant to the present invention also includes the necessary interlocks that are required to assure that the parking brake system cannot be simultaneously operated from both cabs, and that the vehicle is parked when the driver moves from one cab to another.

Figure 2:
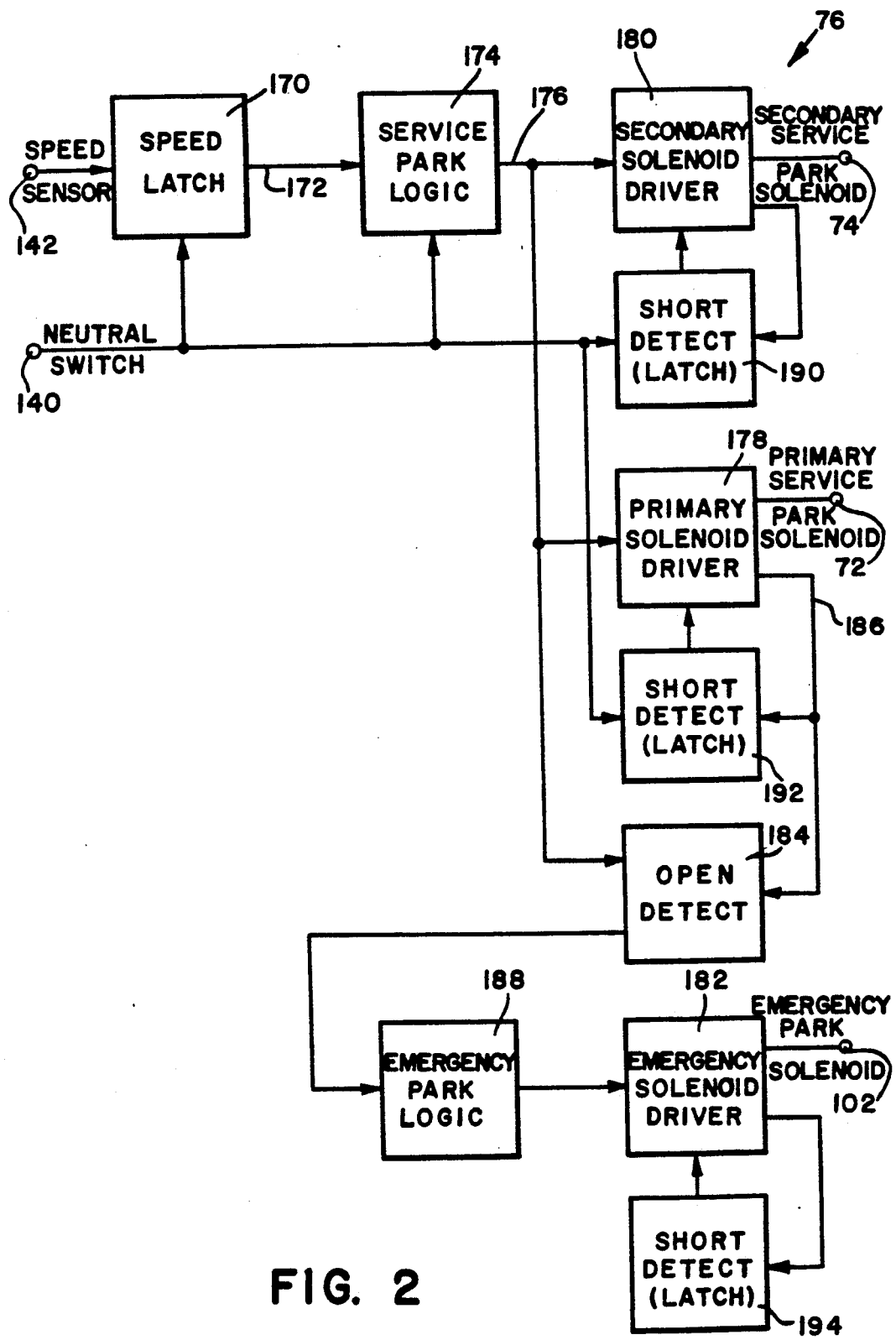

These and other features of the present invention will become apparent from the following description, with reference to the accompanying drawing in which;

FIG. 1 is a schematic illustration of a braking system made pursuant to the teachings of the present invention; and FIG. 2 is an electrical schematic of the control circuit used in the system illustrated in FIG. 1.

Referring now to the drawings, a braking system is generally indicated by the numeral 10 for a vehicle, such as a refuse truck, that must make repeated stops with the brakes applied while the operator leaves the cab. The braking system 10 may be operated from either the normal cab controls generally indicated by the numeral 12 or by the remote cab controls generally indicated by the numeral 14. The normal cab controls 12 are used when the driver is operating the vehicle at normal highway speeds over substantial distances. The remote cab controls 14 are used when the driver is operating the vehicle from the remote cab. The remote cab is placed where the driver may easily exit and return to the vehicle repeatedly to perform his duties. The controls within the normal cab 12 and the remote cab controls 14 including controls effecting control of the vehicle's air brakes, and also includes controls which control the engine throttle. Braking system 10 further includes front service brake actuators 16, which are operated by conventional pneumatic actuators 18. System 10 also includes conventional rear actuators 20, which are actuated by conventional tandem pneumatic actuators 22. Each of the tandem actuators 22 include a spring brake actuator, which is responsive to pressure communicated through emergency port 24 of the actuators 22 to effect an automatic, mechanical brake actuation when the pressure at the port 24 is vented. Actuators 22 further include service ports 26, to which service actuating pressure is communicated when the driver effects a service brake situation. The tandem actuators 22 are conventional, and will not further be described in detail herein.

System 10 further includes a pair of conventional fluid pressure reservoirs 28, 30. Reservoirs 28, 30 are charged with fluid pressure through corresponding check valves 32, 34 by a conventional air compressor (not shown) operated by the engine of the vehicle on which the system 10 is used. Reservoir 28 is communicated to a supply port 36 of a conventional dual brake valve 38 contained within the remote cab control subsystem 14, and is also communicated to one of the supply ports 40 of another conventional dual brake control valve generally indicated by the numeral 42, which is contained within the normal cab control subsystem 12. Reservoir 30 is communicated to the other supply port 44 of dual brake valve 38 and to the other supply port 46 of dual brake valve 42. Upon actuation of the dual brake valve 38, supply port 44 is communicated to deliver port 48 thereof, and supply port 36 is communicated to delivery port 50. Similarly, upon actuation of dual brake valve 42, supply port 40 thereof is communicated to delivery port 52, and supply port 46 is communicated with delivery port 54. Upon release of the dual brake valves 38 or 42, the communication of the corresponding supply ports with the corresponding delivery ports is cut off, and the delivery ports are vented to atmosphere.

Delivery ports 48, 54 of the valves 38, 42 are connected through a conventional double check valve 56, which selects the higher of the fluid pressure levels at the ports 48, 54 for communication through another double check valve 58 to the control port 60 of a conventional relay valve 62. Supply port 64 of relay valve 62 is connected directly to reservoir 30. When a pressure signal is received at control port 60 due to the operation of either the dual brake valves 38 or 42, relay valve 62 communicates service ports 26 of the tandem actuators 22 with the pressure level in the reservoir 30, thereby effecting a service brake application of the rear brakes. Delivery ports 50, 52 of dual brake valves 38, 42 are connected through double check valves 66, 68 and quick release valve 70 to the front service brake actuators 18. Double check valve 66 selects the higher of the pressure levels at the ports 50, 52 for communication to the actuators 18, and conventional quick release valve 70 automatically vents actuators 18 when the pressure communicated to quick release valve 70 drops below a predetermined level.

An important feature of the present invention is that a limited service brake application can be effected and maintained while the vehicle operator leaves the cab. The limited service actuation is effected by operation of conventional electropneumatic solenoid valves 72, 74. Solenoid valves 72, 74 are normally closed, and are actuated by control logic generally indicated by the numeral 76, which will be described in detail hereinafter. Solenoid valve 72 is communicated to the reservoir 28 through pressure reducing valve 78, which reduces the pressure level communicated to the valve 72 so that full reservoir pressure will not be communicated to the service brakes. The outlet of solenoid valve 72 is communicated to the front brake actuators through the double check valve 68. As discussed hereinabove, check valve 68 is also communicated to the higher of the output pressures at ports 50 or 52 of the valves 38, 42. Accordingly, double check valve 68 will communicate the outlet of solenoid valve 72 to the actuator 18 only if neither of the valves 38, 42 are actuated sufficiently to achieve a higher pressure than that achieved by the pressure reducing valve 78. It will be noted that the delivery ports 50, 52 of the valves 38, 42 are, when the valve are actuated, communicated with the supply ports 36 or 40, which are also communicated to the reservoir 28. Accordingly, actuation of the service actuators 18 on the front wheels of the vehicle is always from the reservoir 28, whether the communication between the reservoir 28 and the actuators 18 is controlled by the electropneumatic solenoid valve 72, or by the brake valves 38 or 42. Similarly, electropneumatic solenoid valve 74 is communicated to the reservoir 30 through pressure reducing valve 80. It will be remembered that pressure from reservoir 30 is used to actuate the rear service brakes through ports 26 and relay valve 62 by operation of the brake valves 38 or 42. Accordingly, the rear service brakes may be actuated by either of the foot valves 38 or 42 or by energization of normally closed solenoid valve 74. The outlet of solenoid valve 74 is communicated to control port 60 or relay valve 62 through the double check valve 58.

Communication to the ports 24, which causes the parking/emergency actuators within the tandem actuators 22 to be applied and released, is controlled by push-pull control valve generally indicated by the numeral 82 within the normal cab control subsystem 12 or by push-pull control valve 84 within the remote cab control system 14. Push-pull control valves 82, 84 in their corresponding dual brake valves 42, 38 constitute operator actuated valve means, and the valves 82, 84 constitute manually operated valve means. Each of the control valves 82, 84 include a supply port 86, 88, a delivery port 90, 92, and a control port 94, 96. Valves 82, 84 are conventional, and each are equipped with an operator actuated push-pull knob 98, 100. When the knob 98 or 100 is in the "out" position, communication between the corresponding supply and delivery port is cut off, and the corresponding delivery port is vented to atmosphere. When the handle is pushed to the "in" position, the atmospheric vent is cut off, and the corresponding supply port is communicated to the delivery ports. The knob is moved automatically to the "out" position whenever the pressure level at the supply port 86 or 88 drops below a predetermined pressure level, or when a pressure signal is communicated to the control port 94 or 96.

Communication to the supply port 88 of the valve 84 is controlled by a electropneumatic solenoid valve 102 which is controlled by the control logic 76 as will be hereinafter explained. Solenoid valves 72, 74 and 102, with control logic 76 and the associated inputs thereto, constitute electrically actuated mechanism; the solenoid valves 72, 74, with the control logic 76 constitute a first electrically actuated means; the solenoid valve 102 along with the control logic 76 and the various thereto constitute a second electrically actuated means; and the solenoid valve 102 constitutes electrically actuated valve means. The supply or inlet of the solenoid valve 102, and the supply port 86 of the valve 2, are both connected to the outlet of a double check valve 104.

Check valve 104 selects between the higher of the pressure levels in the reservoirs 28 or 30 for communication to the valves 82, 102. The outlet of double check valve 104 is also communicated to supply port 106 of spring brake relay valve 108. Delivery ports 110 of relay valve 108 are communicated to emergency ports 24 of the tandem actuators 22. Spring brake relay valve 108 is responsive to a pressure signal communicated to control port 112 thereof to control communication between emergency ports 24 and supply port 106. Control port 112 is communicated to delivery port 114 of a conventional spring brake control valve 116. Spring brake control valve 116 is conventional, and normally communicates the pressure level at supply port 118 thereof to the delivery port 114. However, spring brake control valve 116 also includes a service reservoir port 120, which is communicated to the service reservoir 30 which supplies fluid pressure to the wheel service brakes. Accordingly, when the pressure in reservoir 30 drops below some predetermined value, thereby indicating a malfunction such that the rear service brakes are inoperable, the spring brake control valve 116 causes a modulated application of the rear wheel emergency brakes by communicating pressure signals to spring brake relay valve 108. These pressure signals are controlled by communication of fluid pressure signals to control port 122 of spring brake control valve 116, which is communicated with the outlet of double check valve 68, which is communicated to the pressure level communicated to front brake actuators 18. Accordingly, when a service application is effected to the front brakes in the case of a malfunction of the rear service brakes, a limited number of emergency applications of the rear wheel emergency brakes is effected. Since the valve 116 is conventional, it will not be described in detail.

Supply port 118 in the spring brake control valve 116 is connected to the outlet of a double check valve 124. One side of the double check valve 124 is connected to the delivery port 90 of push-pull control valve 98 and the other input of the double check valve 124 is communicated to delivery port 126 of a push and hold control valve or manually manipulatable valve means 128. Supply port 30 of valve 128 is communicated to the inlet side of valve 102, and another supply port 132 of the valve 128 is communicated to the delivery port 92 of the valve 84. Normally, the valve 128 communicates the delivery port 92 of valve 84 directly to the double check valve 124. However, delivery port 92 is vented, due, for example, to operation of the solenoid valve 102 as will hereinafter be explained, the vehicle operator may manually hold knob 134 of the valve 128 in, to thereby communicate a pressure level to the double check valve 124. This permits the vehicle to be moved from a dangerous location if a spring brake application has been effected by operation of the solenoid valve 102.

Delivery port 126, which, is discussed hereinabove, is normally at the same pressure as the delivery port 92 of push-pull control valve 84, is communicated to control port 94 of the valve 82, and delivery port 90 of valve 82 is communicated to control port 96 of the valve 84. Accordingly, the spring brakes may not be simultaneously controlled from both the normal cab subsystem 12 and the remote cab subsystem 14. Delivery port 90 is also connected to a pneumatic switch 136, which is closed to connect the power input port of control logic 76 with a source of electrical power. Accordingly, since switch 136 is closed only when the delivery port 90 of valve 82 is vented, a service application can be effected by electropneumatic solenoid valve 72, 74 only when the vehicle is being operated from the remote cab control subsystem 14 during route pick ups. An indicating light 138 on the vehicle dashboard indicates that the control logic 76 has been enabled. Control logic 76 also receives input from service brake switch 140, which may a neutral switch on the vehicle transmission, and also from speed sensor input 142, which may be connected, for example, to the vehicle speedometer.

The vehicle upon which the braking system 10 is used is also equipped with and engine 143 controlled by a pneumatically operated engine control or throttle 145, which is operated by fluid pressure from the reservoirs 28 or 30. The ignition system of the engine 143 is turned off and on by conventional ignition switch 147. Accordingly, each of the subsystems 12, 14 includes a conventional, operator actuated treadle control valve 144, 146. The delivery ports 148, 150 of the treadle throttle control valves 144, 146 are connected through a double check valve 152 to the pneumatic throttle The inlet or supply ports of the valves 144, 146 are connected to corresponding delivery ports of conventional synchronizing valves 158, 160. The supply ports of the synchronizing valves 158, 160 are communicated to the double check valve 104. Each of the valves 158, 160 responds to pressure signals at its corresponding control port 166, 168 to communicate with the corresponding supply port with the corresponding delivery port, and responds to termination of the pressure signal at the corresponding control port 166, 168 to cut off communication between its supply and delivery ports and to vent the corresponding supply port. Control port 166 is communicated to delivery port 90 of control valve 82, and control port 168 is communicated to control port 126 of valve 128, which, as discussed hereinabove, is normally at the same pressure level as delivery port 92 of control valve 84. Accordingly, valves 144 and 146 may not be operated simultaneously, and each of the valves 144, 146 may be operated only when release of the spring brakes has been effected by the corresponding control valve 82 or 84.

Referring now to FIG. 2, the control logic 76 which controls actuation of the solenoids 72, 74 and 102 will be described in detail. Logic contained within the logic 76 includes a speed latch 170. Speed latch 170 includes a conventional frequency-to-voltage converter which monitors the wheel speed signal transmitted to input terminal 142 and further includes a comparator which is responsive to the wheel speed signal dropping below a predetermined reference level. If the transmission switch 140 is then in neutral, speed latch circuit 170 generates an output signal on terminal 172. Speed latch logic 170 includes a conventional circuit which maintains a signal on output terminal 172 even if the signal increases above the predetermined reference level. Accordingly, a signal remains on terminal 172 after initial drop of speed below the predetermined reference level while the neutral switch 140 in neutral until the transmission is taken out of neutral. Service park logic 174 responds to the signal on terminal 172 on the output of speed latch 170 and the signal generated by switch 140 upon placing of the transmission in neutral to generate a signal output terminal 176 whenever the speed latch 170 is set and the transmission switch 140 is in neutral. The signal on terminal 176 is transmitted to primary and secondary solenoid drivers 178, 180 which actuate the solenoid valves 72, 74. Driver circuits 178, 180 are conventional, and will not be described in detail herein.

Emergency park solenoid is energized by emergency solenoid driver 182, which is similar to the drivers 178 and 180. Emergency park solenoid 182 is a normally closed solenoid which is energized when power is supplied to the circuit upon closure of the pressure actuated switch 136. As discussed hereinabove, when the solenoid 102 is energized, the spring brakes may be set from the remote cab by operation of the valve 84. Logic circuit 76 further includes an open detect logic 184. Open detect 184 receives input from the service park logic output terminal of 176 and also from the output of primary solenoid driver 178. Obviously, a normal service brake actuation, when a signal is transmitted on terminal 176, both of the inputs to open detect logic 184 should be positive, since the signal on terminal 176 actuates the primary solenoid driver 178. The output on terminal 186 of primary solenoid driver 178 will be positive due to actuation of the primary service part solenoid 72. Accordingly, open detect logic 184 generates an output signal only in the event that the signal on terminal 176 is high while the signal on terminal 186 is low, thereby indicating a failure in the primary service solenoid 72 or in the driver circuit 178. Open detect logic 184 thereupon generates a signal which is transmitted to emergency park logic 188. As discussed above, emergency park logic 188 normally maintains the emergency solenoid driver 182 in a state which actuates emergency park solenoid 102 whenever power is applied to the circuit by closure of the pressure switch 136. However, emergency park logic 188 responds to a signal from open detect logic 184 to turn off the emergency park solenoid 102, thereby effecting a spring brake actuation. Of course, emergency park solenoid 102 will also be turned off, thereby effecting a spring brake actuation, whenever electrical power is turned off, which would occur, for instance, when the ignition switch 147 is turned off.

Solenoid drivers 178, 180 are protected by short detecting logic latching circuits 190, 192. Both of these circuits respond to a closure of the switch 140 to monitor the driver circuits 178, 180 and solenoid 72, 74. In case of excessive or current draw through the solenoids, thereby indicating a short circuit, the conventional short detecting latching logic 190, 192, turns off the corresponding solenoid driver 178, 180. Emergency solenoid driver 182 and emergency park solenoid 102 are similarly protected by short detecting latching logic 194, which turns off the emergency solenoid driver 182 to thereby effect a spring brake application when current draw through the solenoid 102 becomes excessive, thereby indicating a failure.

In operation, the vehicle upon which the braking system 10 is mounted will normally be actuated by the normal cab control subsystem 12 at all times other than when making route pickups. Accordingly, the spring actuated, emergency/parking actuators within tandem actuators 22 will be released by pushing knob 98 of valve 82 in, thereby communicating release pressure to the spring brake actuators. Accordingly, control of the vehicle throttle is effected by operation of valve 144, and a service brake actuation is effected by operation of valve 42. Under these conditions, the electrical service brake actuating system is inoperable, since the pneumatically operated switch 136 is opened due to high pressure at delivery port 90 of the valve 82.

As discussed above, when making route pickups, it is desirable to effect and hold a limited service brake application instead of using the parking brakes, since repeated cycling of the spring actuators contained within tandem actuators 22 is undesirable. Accordingly when route pickups are to be made, the vehicle operator pulls out the knob 98, thereby venting delivery port 90. Venting of delivery port 90 closes the pneumatically operated switch 136, thereby permitting operation of the service brakes by electrical switch 140 and the control logic 76, as long as the speed of the vehicle is below a relatively low speed. Venting of delivery port 90 also vents control port 96 of valve 84. Accordingly, when the operator moves to the remote cab, the spring brakes can be released by operation of valve 84. Accordingly, the vehicle can be operated by throttle valve 146, and a service brake application may be effected by operation of valve 38. However, assuming that the speed signal transmitted through terminal 142 is below a predetermined maximum speed, a limited service brake application may be effected and maintained while the operator leaves the cab in order to make a route pickup. Such a limited service brake application is effected by operation of service braking switch 140. Operation of switch 140, as discussed above, energizes solenoid valves 74, 78, thereby communicating a predetermined pressure level, which is less than the pressure level in the service 28, 30 since the service pressure level has been reduced by the pressure reducing valves 78, 80, to both the front wheel service brake actuators 18 and the service ports 26 of the rear wheel tandem actuators 22. This limited service application is maintained as long as the switch 140 remains closed.

Since it is possible that, due to a malfunction of valve 102, that the spring brakes may be inadvertently applied, a push and hold valve 128 is connected in series with the delivery port 92 of the valve 84. The supply port 103 is connected directly to the check valve 104, which selects the higher values of the pressures in reservoirs 28 and 30. Accordingly, if the valve 84 is actuated by a malfunction of the solenoid actuator 102, the vehicle may still be moved from a dangerous location by holding in knob 134 of valve 128, thereby communicating hold-off pressure from supply port 130 to delivery port 126 thereof, and therefore to the control port 112 of relay valve 108 as discussed hereinabove.

We claim:

1. Fluid pressure braking system for a vehicle, comprising a pressure source, service brakes responsive to pressure communicated from said pressure source for effecting a service brake application, mechanically applied parking brakes released by fluid pressure from said source, operator actuated valve means for controlling communication to said service brakes and to said parking brakes, an electrically actuated mechanism for controlling communication from said pressure source to said service and parking brakes, said electrically actuated mechanism including first electrically actuated means controlled by the vehicle operator for effecting and maintaining a limited application of the vehicle service brakes without operation of the operator-actuated valve means by communicating the service brakes to the pressure source in response to an electrical signal control by the vehicle operator, and second electrically actuated means for effecting actuation of the parking brakes in response to a predetermined vehicle condition when the service brakes are actuated by the first electrically actuated means.

2. Fluid pressure braking system as claimed in claim 1, wherein said operator actuated valve means includes manually operated valve means shiftable from a brake released position communicating fluid pressure to said parking brakes to a brake applied position venting fluid pressure from said parking brakes, said second electrically actuated means controlling said manually operated valve means.

3. Fluid pressure braking system as claimed in claim 2, wherein said manually operated valve means is responsive to control pressure to move between said brake released and brake applied positions, said second electrically actuated means including electrically actuated valve means controlling said control pressure.

4. Fluid pressure braking system as claimed in claim 2, wherein said manually operated valve means includes an inlet communicated to said pressure source and an outlet communicated to said parking brakes, said manually operated valve means being responsive to control pressure at said inlet to vent the outlet, said second electrically actuated means including electrically actuated valve means for venting said inlet in response to said predetermined vehicle conditions.

5. Fluid pressure braking system as claimed in claim 4, wherein said system includes manually manipulatable valve means for overriding the parking brake application effected by said electrically actuated valve means and said manually operated valve means.

6. Fluid pressure braking system as claimed in claim 2, wherein said system includes manually manipulatable valve means for overriding the parking brake application effected by said electrically actuated valve means and said manually operated valve means.

7. Fluid pressure braking system as claimed in claim 2, wherein said electrically actuated mechanism includes pressure responsive switch means for enabling and disabling said electrically actuated mechanism, and control valve means operable by the vehicle operator for communicating a control pressure to said pressure responsive switch means.

8. Fluid pressure braking system as claimed in claim 2, wherein said electrically actuated mechanism includes means for generating a signal which varies in accordance with the speed of the vehicle, said electrically actuated mechanism disabling said second electrically actuated means to prevent actuation of the service brakes by the second electrically actuated means when the speed of the vehicle exceeds a predetermined level.

9. Fluid pressure braking system as claimed in claim 8, wherein said vehicle has an engine and an ignition switch between engine on and engine off positions for controlling the engine, said electrically actuated mechanism being responsive to movement of the ignition switch to the engine off position to cause the second electrically actuated means to move the manually operated valve means to the brake applied position.

10. Fluid pressure braking system as claimed in claim 2, wherein said vehicle has an engine and an ignition switch between engine on and engine off positions for controlling the engine, said predetermined vehicle condition including movement of the ignition switch from the engine on to the engine off position.

11. Fluid pressure braking system as claimed in claim 2, wherein said system includes a pair of said manually operated valve means, each of said manually operated valve means including means responsive to the other manually operated valve means so that when one of said manually operated valve means is moved to the position supplying fluid pressure to the parking brakes the other manually operated valve means is moved to a position in which communication through the other manually operated valve means is cut off, and means for selecting the higher pressure communicated from said manually operated valve means for communication to the parking brakes.

12. Fluid pressure braking system as claimed in claim 11, wherein said vehicle includes an engine, and said system includes a fluid pressure operated engine control for controlling said engine, a pair of operator actuated engine control valves for controlling communication from said source to said engine, each of said engine control valves including means responsive to a corresponding one of said manually operated valve means to enable and disable the corresponding engine control valve upon operation of the corresponding manually operated valve means.

13. Fluid pressure braking system as claimed in claim 11, wherein said operator actuated valve means includes a pair of operator actuated brake control valves, and means for selecting between the output of the brake control valves for communicating the higher pressure output of the brake control valve for actuating said service brakes.

14. Fluid pressure braking system for a vehicle, comprising a pressure source, service brakes responsive to pressure communicated from said pressure source for effecting a service brake application, mechanically applied parking brakes released by fluid pressure from said source, operator actuated valve means for controlling communication to said service brakes and to said parking brakes, a pair of manually operated valve means shiftable from a brake released position communicating fluid pressure to said parking brakes to a brake applied position venting fluid pressure from said parking brakes, said second electrically actuated means controlling said manually operated valve means, each of said manually operated valve means including means responsive to the other manually operated valve means so that when one of said manually operated valve means is moved to the position supplying fluid pressure to the parking brakes the other manually operated valve means is moved to a position in which communication through the other manually operated valve means is cut off, and means for selecting the higher pressure communicated from said manually operated valve means for communication to the parking brakes.

15. Fluid pressure braking system as claimed in claim 14, wherein said vehicle includes an engine, and said system includes a fluid pressure operated engine control for controlling said engine, a pair of operator actuated engine control valves for controlling communication from said source to said engine, each of said engine control valves including means responsive to a corresponding one of said manually operated valve means to enable and disable the corresponding engine control valve upon operation of the corresponding manually operated valve means.

16. Fluid pressure braking system as claimed in claim 14, wherein said operator actuated valve means includes a pair of operator actuated brake control valves, and means for selecting between the output of the brake control valves for communicating the higher pressure output of the brake control valve for actuating said service brakes.

* * * * *